(12) United States Patent
Iharada

(10) Patent No.: US 11,772,173 B2
(45) Date of Patent: Oct. 3, 2023

(54) BALL END MILL

(71) Applicant: MOLDINO Tool Engineering, Ltd., Tokyo (JP)

(72) Inventor: Yuki Iharada, Yasu (JP)

(73) Assignee: MOLDINO TOOL ENGINEERING, LTD., Tokyo (JP)

( * ) Notice: Subject to any disclaimer, the term of this patent is extended or adjusted under 35 U.S.C. 154(b) by 0 days.

(21) Appl. No.: 17/779,422

(22) PCT Filed: Jan. 8, 2021

(86) PCT No.: PCT/JP2021/000500
§ 371 (c)(1),
(2) Date: May 24, 2022

(87) PCT Pub. No.: WO2021/141116
PCT Pub. Date: Jul. 15, 2021

(65) Prior Publication Data
US 2022/0410290 A1    Dec. 29, 2022

(30) Foreign Application Priority Data

Jan. 9, 2020   (JP) .................................. 2020-002442

(51) Int. Cl.
*B23C 5/10* (2006.01)
(52) U.S. Cl.
CPC ........ *B23C 5/1009* (2013.01); *B23C 2200/32* (2013.01); *B23C 2220/64* (2013.01)
(58) Field of Classification Search
CPC .......... B23C 2210/0428; B23C 5/1009; B23C 2220/64; B23C 2210/0435;
(Continued)

(56) References Cited

U.S. PATENT DOCUMENTS 7,909,545 B2 *   3/2011   Volokh .................. B23C 5/1009
                                                            407/53
2005/0271482 A1   12/2005   Volokh
(Continued)

FOREIGN PATENT DOCUMENTS

GN       1942277 A       4/2007
JP     2005-066701 A      3/2005
(Continued)

OTHER PUBLICATIONS

Office Action dated Sep. 1, 2022, issued for Chinese Patent Applicationn No. 202180006700.X and English translation thereof.
(Continued)

*Primary Examiner* — Sara Addisu
(74) *Attorney, Agent, or Firm* — Locke Lord LLP

(57) ABSTRACT

Provided is an end mill which includes an end mill main body having a bottom blade having a convex hemispherical shape, and a hard coating film coated on at least a surface of a distal end portion of the end mill main body. A diameter D (mm) of the bottom blade is 2 mm or less. A ratio W/D of a width W (mm) of a chisel portion to the diameter D (mm) is within a range of 0.020 to 0.060. A ratio L/D of a facing length L (mm) of chip discharge grooves to the diameter D (mm) is within a range of 0.014 to 0.090. A rake angle of the bottom blade in a range in which a chisel edge is formed in the chisel portion is within a range of −15° to −30°.

3 Claims, 4 Drawing Sheets

(58) Field of Classification Search
CPC .... B23C 2210/0457; B23C 2210/0485; B23C 2210/202–209; B23C 2210/40; B23C 2210/54; B23C 2210/0421; B23C 2228/10; B23C 2200/32
See application file for complete search history.

(56) References Cited

U.S. PATENT DOCUMENTS

| | | | |
|---|---|---|---|
| 2007/0172321 A1 | 7/2007 | Nagai | |
| 2011/0211922 A1* | 9/2011 | Maeda | B23C 5/1009 407/54 |
| 2015/0030396 A1* | 1/2015 | Abe | B23C 5/28 407/11 |
| 2015/0043980 A1* | 2/2015 | Matsumoto | B23C 5/1009 407/54 |
| 2015/0258617 A1* | 9/2015 | Kiuchi | B23C 5/1036 407/42 |
| 2016/0175948 A1* | 6/2016 | Sakai | B23C 5/1009 407/54 |
| 2020/0038972 A1 | 2/2020 | Kiuchi et al. | |
| 2020/0047263 A1 | 2/2020 | Maeda et al. | |

FOREIGN PATENT DOCUMENTS

| | | |
|---|---|---|
| JP | 2005-205593 A | 8/2005 |
| JP | 2006-088232 A | 4/2006 |
| JP | 2007-260856 A | 10/2007 |
| JP | 2010-201607 A | 9/2010 |
| JP | 5448241 B2 | 3/2014 |
| JP | 2018-126832 A | 8/2018 |
| JP | 2018-199198 A | 12/2018 |
| WO | 2018/074542 A1 | 4/2018 |
| WO | 2018/168341 A1 | 9/2018 |

OTHER PUBLICATIONS

International Search Report dated Mar. 30, 2021, issued for PCT/JP2021/000500 and English translation thereof.

* cited by examiner

BALL END MILL

TECHNICAL FIELD

The present invention relates to a ball and mill.

An embodiment of the present invention relates to a ball end mill in which two chip discharge grooves opening to distal end flank faces of an end mill main body and extending to a rear end side are formed to be rotationally symmetrical with respect to an axis on an outer circumference of a distal end portion of the end mill main body that is rotated around the axis in an end mill rotation direction, and a cutting blade having a convex hemispherical shape whose rotation trajectory around the axis has a center on the axis is formed on each of intersecting ridge line portions between wall surfaces of the chip discharge grooves facing the end mill rotation direction and the distal end flank faces of the end mill main body.

Priority is claimed on Japanese Patent Application No. 2020-002442 filed on Jan. 9, 2020, the content of which is incorporated herein by reference.

BACKGROUND ART

As such a ball end mill, for example, Patent Document 1 describes that, in a ball end mill including a pair of spiral outer circumferential blades provided on an outer circumference of an end mill main body (tool main body) that is rotated around an axis, a pair of bottom blades (R cutting blades), that are formed in an arc shape in a front view and whose outer end portions are connected to the outer circumferential blades, provided at a distal end portion of the tool main body, and a chisel edge provided between end portions of the R cutting blades on a center side of the tool main body, a center height of each of the R cutting blades on a center side of the tool main body is set to 1.5% to 8.0% of a radius of the tool, a chisel angle of the chisel edge is set to 30° to 90°, and a small relief in which a clearance angle is set to 2° to 7° and a clearance width is set to 0.3% to 4.0% of the radius of the tool is provided on a flank face of each of the R cutting blades.

CITATION LIST

Patent Document

Patent Document 1

Japanese Unexamined Patent Application, First Publication No. 2006-088232

SUMMARY OF INVENTION

Technical Problem

Incidentally, Patent Document 1 also describes that a CBN sintered body or a diamond sintered body is used as a material of a base material of the end mill main body in addition to a general cemented carbide. However, such a ball end mill using a CBN sintered body or a diamond sintered body as the base material has high hardness and a long service life, but is expensive.

On the other hand, in recent years, improvements have been made to hard coating films. A coated cutting tool in which a cemented carbide coated with a hard coating film having wear resistance comparable to that of a CBN sintered body tool is used as a base material has been developed in cutting work of a high hardness material. When at least a surface of a distal end portion of an end mill main body of the ball end mill on which a bottom blade is formed is coated with a hard coating film having excellent wear resistance, it is possible to perform stable cutting work over a relatively long period of time even for a workpiece having a high hardness.

Stable cutting work is possible in a state in which a surface of the distal end portion of the end mill main body is firmly coated with the hard coating film. However, when the hard coating film is peeled off from the surface and the base material is exposed, the end mill main body suddenly wears from a portion in which the base material is exposed and reaches the end of its service life. Particularly, in a ball end mill with a small diameter in which a diameter D (mm) of a convex hemisphere formed by a bottom blade in a rotation trajectory around the axis is, for example, 2 mm or less, a rotation speed of the bottom blade becomes small, a cutting load becomes high, and thereby the hard coating film is likely to peel off.

Of the ball end mills having a small diameter in which a diameter of the bottom blade is 2 mm or less, in a ball end mill in which an axis of the end mill main body intersects a chisel portion at a distal end portion of the end mill main body, a rotation speed becomes 0 around the axis intersecting the chisel portion. Therefore, unless a shape and dimensions of the chisel portion are made such that the hard coating film is difficult to peel off it will be difficult to perform stable cutting work over a long period of time.

An objective of the present invention is to provide a ball end mill in which occurrence of peeling of a hard coating film, especially in a chisel portion, can be curbed even in a ball end mill with a small diameter in which a diameter of a bottom blade is 2 mm or less, and stable cutting work can be reliably performed over a long period of time.

Solution to Problem

A ball end mill according to one aspect of the present invention is a ball end mill including an end mill main body rotated around an axis in an end mill rotation direction, and a hard coating film coated on at least a surface of a distal end portion of the end mill main body. Two chip discharge grooves opening to distal end flank faces of the end mill main body and extending to a rear end side are formed on an outer circumference of the distal end portion of the end mill main body to be rotationally symmetrical with respect to the axis. A bottom blade having a convex hemispherical shape whose rotation trajectory around the axis has a center on the axis is formed on each of intersecting ridge line portions between wall surfaces of the two chip discharge grooves facing the end mill rotation direction and the distal end flank faces. A diameter D (mm) of a convex hemisphere formed by the bottom blade in the rotation trajectory around the axis is 2 mm or less. The chip discharge grooves face each other on opposite sides with the axis interposed therebetween without overlapping each other when viewed from a distal end side in the axial direction. A ratio W/D of a width W (mm) of a chisel portion left between the facing chip discharge grooves to the diameter D (mm) is within a range of 0.020 to 0.060. A ratio L/D of a facing length L (mm) of the chip discharge grooves to the diameter D (mm) is within a range of 0.014 to 0.090. A rake angle of the bottom blade in a range in which a chisel edge is formed in the chisel portion is within a range of −15° to −30°.

In the ball end mill configured as described above, the chip discharge grooves face each other on opposite sides with the axis interposed therebetween without overlapping each other when viewed from the distal end side in the axial direction. The ratio W/D of the width W (mm) of the chisel portion left between the facing chip discharge grooves to the diameter (diameter of the bottom blade) D (mm) is within a range of 0.020 to 0.060. The ratio L/D of the facing length L (mm) of the chip discharge grooves to the diameter D (mm) is within the range of 0.014 to 0.090. With such configurations, a sufficient size can be secured for the width W of the chisel portion and the facing length L which is a length of the chisel portion within a range that does not become larger than necessary. Therefore, peeling of the hard coating film in the chisel portion can be curbed, the cutting blade can be prevented from chipping, having omissions, or the like even for a workpiece with a high hardness, and thereby stable cutting work can be reliably performed over a long period of time.

In the above-described configuration, when the ratio W/D is increased to some extent to secure an appropriate extension distance (depth) of the coating film toward the rear of the chisel edge in the rotation direction, adhesion of the coating film of the chisel portion to the base material can be maintained, and early peeling off of the coating film from the base material can be curbed. Moreover, when the ratio W/D is reduced to a predetermined range and the extension distance (depth) of the coating film toward the rear of the chisel edge in the rotation direction is appropriately suppressed, an increase in cutting load applied to the coating film of the chisel portion is alleviated, and the coating film of the chisel portion is made to sufficiently withstand peeling from the base material. As a result, chipping and omissions in the chisel portion can be curbed.

When the ratio W/D of the width W (mm) of the chisel portion to the diameter D (mm) is less than 0.020, a width of the chisel portion becomes too small and the hard coating film cannot be coated with a sufficient thickness. There is a likelihood that chipping will occur due to a cutting load. Also, when the ratio W/D exceeds 0.060, the hard coating film on the chisel portion becomes too thick, the rotation trajectory may protrude from the convex hemisphere having a center on the axis, and this may cause deterioration in accuracy of the worked surface of the workpiece. Also, since a capacity of the chip discharge groove is reduced, there is a likelihood that chip dischargeability will be impaired.

In the above-described configuration, when the ratio L/D is reduced to a certain size, the chisel portion, which is left between the facing two chip discharge grooves and made thin, does not become too long, and thereby the coating film being quickly peeled off from the base material is curbed. Moreover, when the ratio L/D is increased to some extent, chip dischargeability in the vicinity of the chisel edge can also be obtained, and peeling of the coating film due to accumulation of chips in the vicinity of the chisel portion can be curbed. As a result, chipping and omissions in the chisel portion can be curbed.

Also when the ratio L/D of the facing length L (mm) of the chip discharge grooves, which is a length of the chisel portion, to the diameter D (mm) is less than 0.014, a capacity of the chip discharge groove is reduced, and thereby there is a likelihood of impairing the chip dischargeability. Also, when the ratio L/D exceeds 0.090, the chisel portion which is left between the facing two chip discharge grooves and made thin becomes long. Even if the hard coating film has been coated, a strength of the base material portion of the end mill main body is lowered, and a defect or the like is likely to occur.

According to above-described configuration, when the rake angle of the bottom blade is increased in a negative direction, a lip angle is increased, a strength of the chisel portion, whose rotation speed is close to 0 and cutting resistance is large, is improved, and thereby peeling of the coating film can be curbed. Moreover, when the rake angle of the bottom blade is reduced to a certain size or less in the negative direction, cutting resistance can be inhibited from becoming excessive, and thereby peeling of the coating film can be curbed.

In the ball end mill of the above-described configuration, the rake angle of the bottom blade in a range in which the chisel edge is formed in the chisel portion is set to be large within a range of −15° to −30° on a negative angle side. Thereby, a lip angle of the bottom blade including a vicinity of the chisel portion can be increased. The hard coating film with a sufficient thickness can also be coated on the bottom blade which is an intersecting ridge line portion between the wall surface (rake face) of the chip discharge groove facing the end mill rotation direction and the distal end flank face. Occurrence of chipping, omissions, or the like can be prevented by improving a strength of the bottom blade itself.

When the rake angle of the bottom blade is larger than −15° on a positive angle side, a sufficient lip angle cannot be secured. The rake face is worn by cutting work over a short period of time, the rake angle becomes an extremely negative angle, and this causes an increase in cutting resistance. Thereby, a rotational drive force of the end mill main body increases. Also, when the rake angle of the bottom blade is larger than −30° on a negative angle side, cutting resistance from the beginning of the cutting work becomes too large, and the rotational drive force of the end mill main body increases.

Further, in order to reduce cutting resistance while securing a lip angle of the bottom blade in this way, it is desirable that the above-described distal end flank faces be each formed by a plurality of flank face portions in which a clearance angle increases from the bottom blade toward a side opposite to the end mill rotation direction.

Advantageous Effects of Invention

As described above, according to the present invention, occurrence of peeling of a hard coating film in the chisel portion can be curbed even in a ball end mill having a small diameter in which a diameter of the bottom blade is 2 mm or less. Occurrence of chipping, omissions, or the like can be prevented in the cutting blade even for a workpiece with a high hardness, and stable cutting work can be reliably performed over a long period of time.

DESCRIPTION OF EMBODIMENTS

Figure 1:
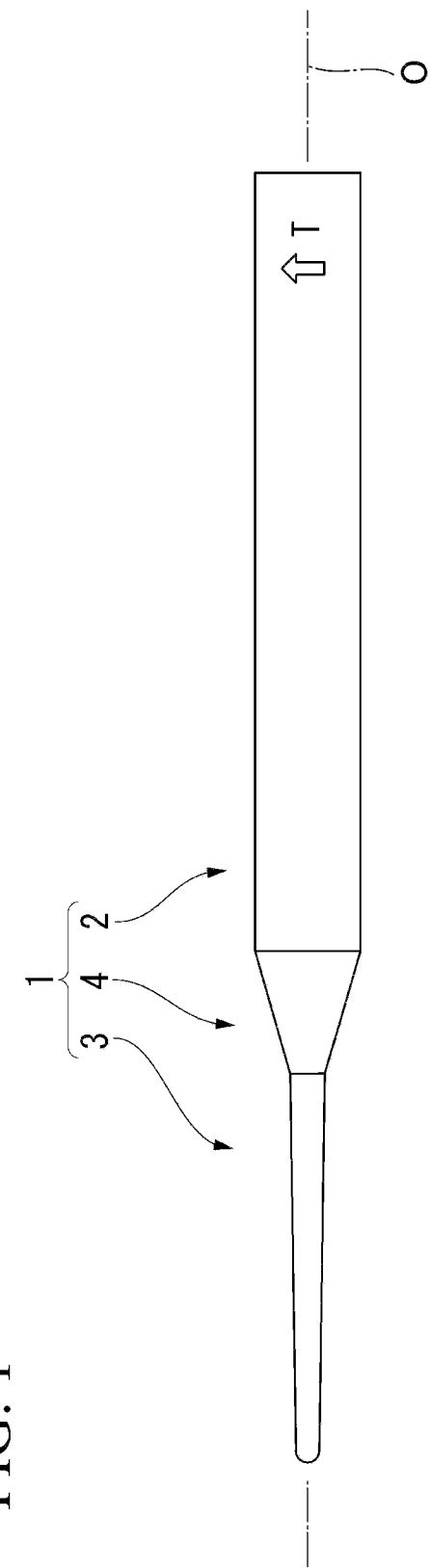
FIG. 1 is a side view illustrating an outline of one embodiment of the present invention.

FIGS. 1 to 4 are views illustrating one embodiment of the present invention. An end mill of the present embodiment includes an end mill main body 1 illustrated in FIG. 1 and a hard coating film formed on a surface of the end mill main body 1. In the present embodiment, the end mill main body 1 is integrally formed of a base material made of a hard material such as a cemented carbide in a schematically columnar shape in multiple stages as illustrated in FIG. 1 with an axis O as a center. A rear end portion (right portion in FIGS. 1 and 2) of the end mill main body 1 is a shank part 2 having a large-diameter columnar shape. A distal end portion (left portion in FIGS. 1 and 2) of the end mill main body 1 is a substantially columnar cutting blade part 3 having a diameter smaller than that of the shank part 2. Also, the shank part 2 and the cutting blade put 3 are connected by a taper-shaped and truncated cone-shaped tapered neck part 4 with the axis O as a center.

Such a ball end mil performs cutting work on a workpiece by a cutting blade 5 formed on the cutting blade part 3 when the shank part 2 gripped by a main spindle of a machine tool is sent out in a direction intersecting the axis O while being rotated around the axis O in an end mill rotation direction indicated by the reference sign T in the drawing.

Two chip discharge grooves 7 opening to distal end flank faces 6, which are distal end faces of the end mill main body 1, and extending to a rear end side are formed on an outer circumferential portion of the cutting blade part 3 to be rotationally symmetrical with respect to the axis O. The chip discharge grooves 7 are each formed to be spirally twisted toward a side opposite to the end mill rotation direction T around the axis O toward a rear end side of the end mill main body 1. Further, the and mill main body 1 is formed to have a 180° rotationally symmetric shape with respect to the axis O.

Figure 2:
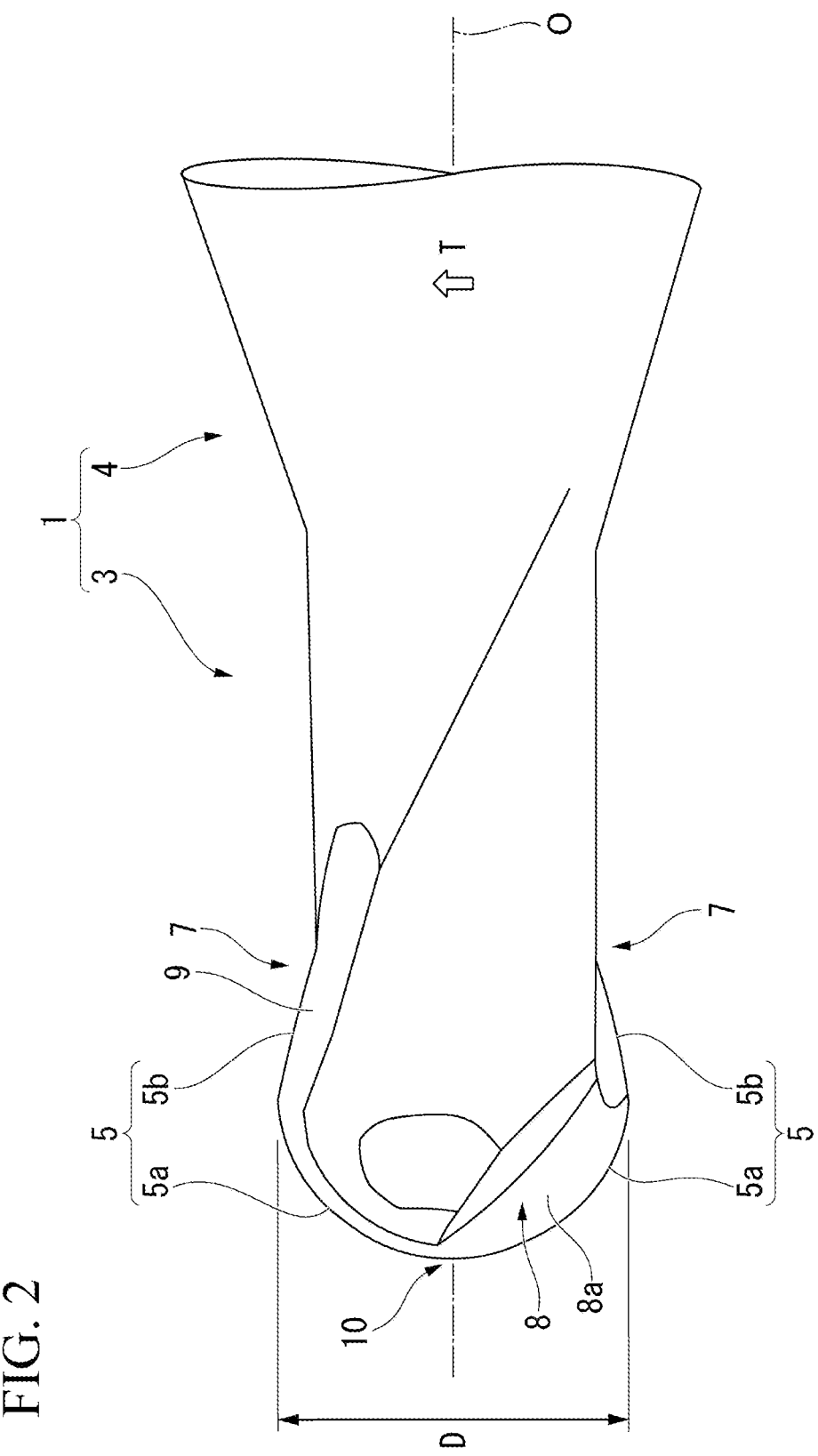
FIG. 2 is an enlarged side view of a distal end portion of the embodiment illustrated in FIG. 1.

Also, a recessed groove-shaped gash 8 having a substantially V-shaped cross section is formed at each of distal end portions of the chip discharge grooves 7 to extend toward an inner circumferential side of the end mill main body 1 as it goes to the distal end side. A wall surface 8a of the gash 8 is a wall surface of the chip discharge groove 7 facing the end mill rotation direction T. A bottom blade 5a is formed on an intersecting ridge line portion between the wall surface 8a of the gash 8 facing the end mill rotation direction T and the distal end flank face 6. The bottom blade 5a has a convex hemispherical shape in which a rotation trajectory around the axis O has a center on the axis O as illustrated in FIG. 2. A diameter D (mm) of a convex hemisphere formed by the rotation trajectory of the bottom blade 5a is set to 2 mm or less. However, if the diameter D (mm) of the bottom blade 5a becomes too small, it may be difficult to control a width W of a chisel portion 10 to be described later and a facing length L of the chip discharge grooves 7 which is a length of the chisel portion 10. Therefore, the diameter D (mm) of the bottom blade 5a is preferably 0.2 mm or more.

An outer circumferential flank face 9 is formed on an outer circumferential surface of the cutting blade part 3 to be continuous with a side of the chip discharge groove 7 opposite to the end mill rotation direction T. An outer circumferential blade 5b of the cutting blade 5 is formed on an intersecting ridge line portion between the outer circumferential flank face 9 and a wall surface of the chip discharge groove 7 facing the end mill rotation direction T on a rear end side of the gash S. The outer circumferential blade 5b has a cylindrical surface shape centered on the axis O in which a rotation trajectory thereof around the axis O has a diameter equal to the diameter D (mm) of the convex hemisphere formed by the rotation trajectory of the bottom blade 5a. The outer circumferential blade 5b of the cutting blade 5 is formed to be continuous with a rear end of the bottom blade 5a.

Figure 3:
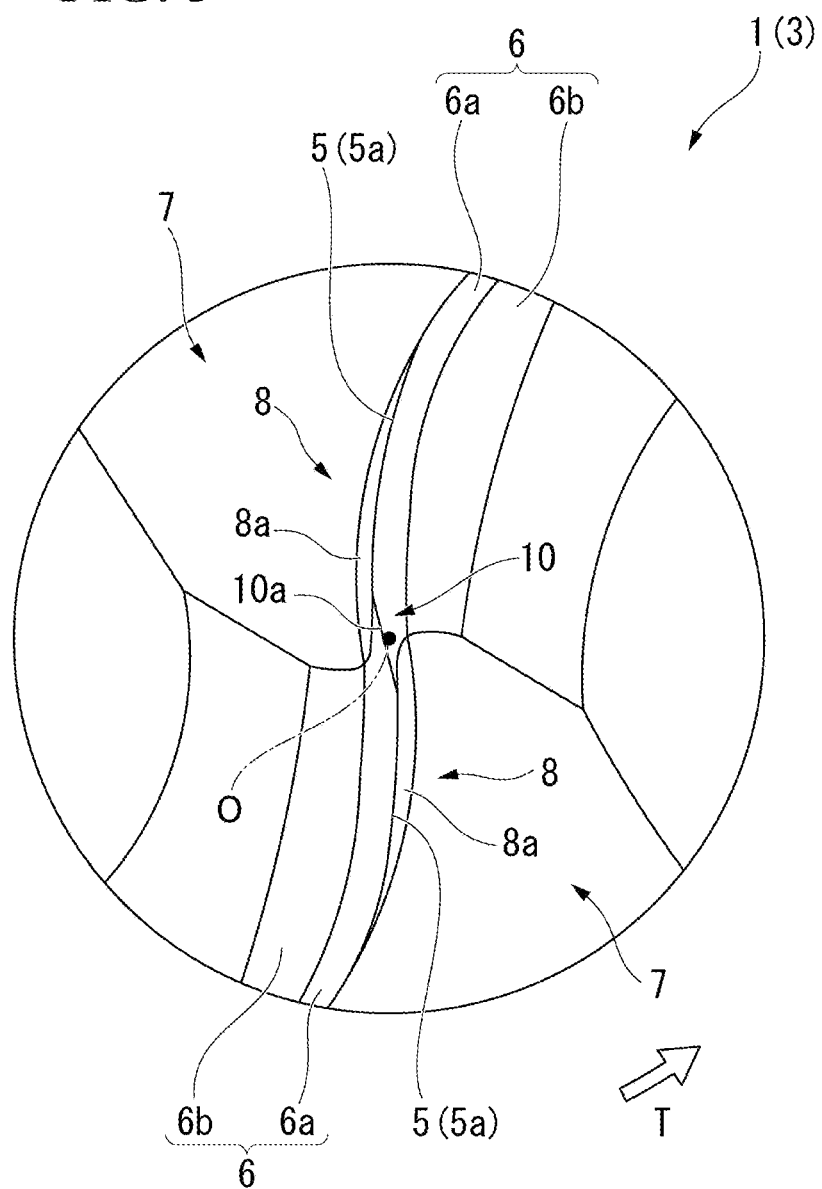
FIG. 3 is an enlarged front view of the distal end portion of the embodiment illustrated in FIG. 1, and viewed from a distal end side in an axial direction.
Figure 4:
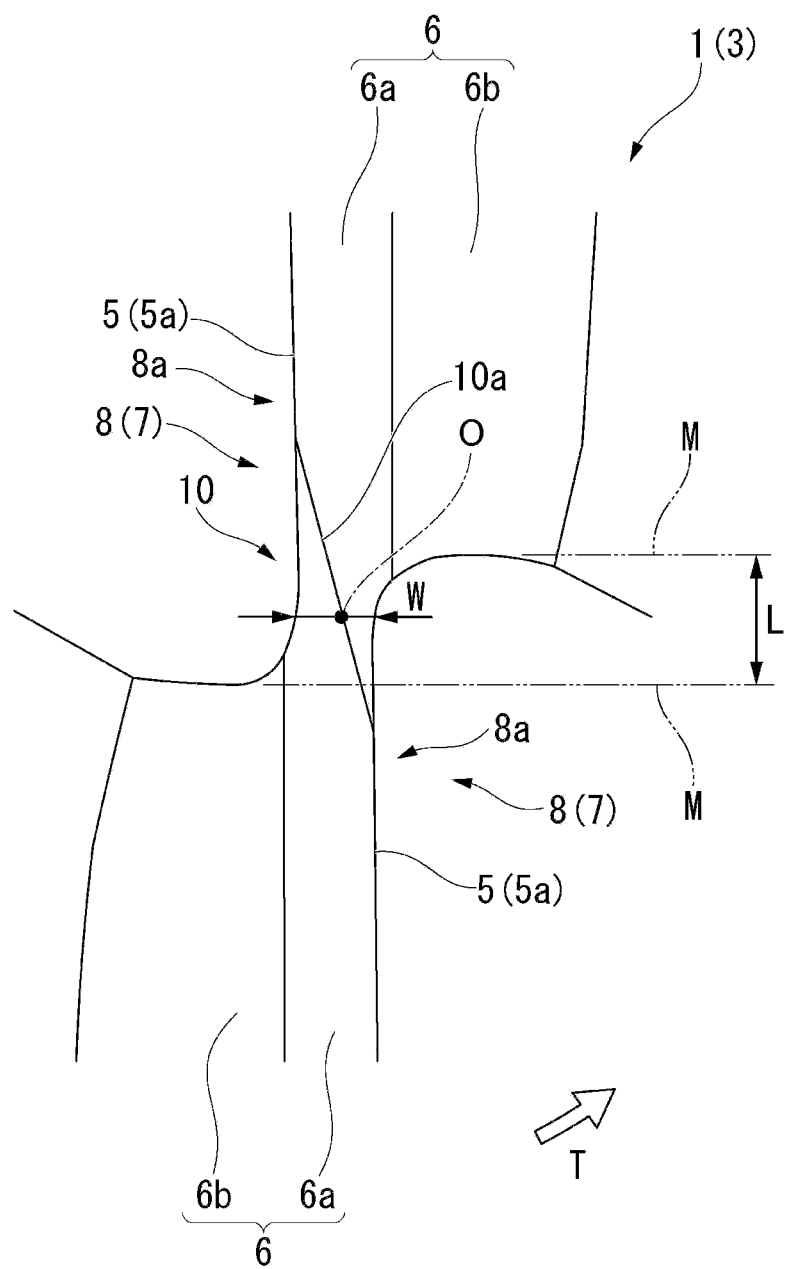
FIG. 4 is a front view in which a vicinity of a chisel portion in the enlarged front view illustrated in FIG. 3 is further enlarged.

As illustrated in FIGS. 3 and 4, the two gashes 8 at distal end portions of the two chip discharge grooves 7 face each other on opposite sides with the axis O interposed therebetween without overlapping each other when viewed from a distal end side in the axis O direction. Therefore, as illustrated in FIG. 2, an inner circumferential portion of the wall surface 8a of the gash 8 facing the end mill rotation direction T extends past the axis O in a side view from a direction facing the wall surface 8a.

A distal end inner circumferential portion of the cutting blade part 3 is formed so that the chisel portion 10 is left between the two gashes 8 facing each other in this way. A chisel edge 10a that intersects the axis O is formed in the chisel portion 10. The chisel edge 10a is defined as an intersecting ridge line in which the two distal end flank faces 6 continuous with a side of the two bottom blades 5a opposite to the end mill rotation direction T intersect.

In the present embodiment, the distal end flank face 6 is formed by a plurality (two) of a first flank face portion 6a and a second flank face portion 6b in which a clearance angle increases stepwise from the bottom blade 5a toward a side opposite to the end mill rotation direction T. The chisel edge 10a is formed on an intersecting ridge line between the first flank face portions 6a of the two flank face portions.

As illustrated in FIG. 4, when viewed from the distal end side in the axis O direction, a width W (mm) of the chisel portion 10 left between the gashes 8 of the two chip discharge grooves 7 is set to a length in which a ratio W/D of the chisel portion 10 to the diameter D (mm) is within a range of 0.020 to 0.060. Also, the facing length L (mm) of the gashes 8 of the two chip discharge grooves 7, which is the length of the chisel portion 10, is set to a length in which a ratio L/D of the facing length L to the diameter D (mm) is within a range of 0.014 to 0.090.

As illustrated in FIG. 4, when viewed from the distal end side in the axis O direction, the width W (mm) of the chisel portion 10 is a width of the thinnest portion between the wall surfaces 8a facing the end mill rotation direction T in the gashes 8 of the two chip discharge grooves 7 facing each other. Also, the facing length L (mm) of the gashes 8 of the two chip discharge grooves 7 is a distance between two straight lines M that are perpendicular to the bottom blade 5a on the chisel portion 10 side and are in contact with the two gashes 8 from an outer circumferential side of the end mill main body 1 when viewed from the distal end side in the axis O direction as illustrated in FIG. 4.

The wall surface 8a of the gash 8 facing the end mill rotation direction T is an inclined surface facing the end mill rotation direction T side toward a center side of the convex hemisphere formed by the rotation trajectory of the bottom blade 5a away from the bottom blade 5a. Thereby, a negative rake angle is given to the bottom blade 5a in a range in which the chisel edge 10a is formed in the chisel portion 10. The rake angle of the bottom blade 5a in the present specification means a true rake angle of the bottom blade 5a in a cross section perpendicular to the bottom blade 5a. The rake angle of the bottom blade 5a is within a range of −15° to −30°.

Furthermore, a surface of at least the cutting blade part 3 at the distal end portion of the end mill main body 1 is coated with a hard coating film although a reference sign thereof is omitted. In the present embodiment, the entire surface of the end mill main body 1 including the shank part 2 and the tapered neck part 4 is coated with a hard coating film. The hard coating film of the present embodiment is coated by using a physical vapor deposition method having a relatively low coating temperature. Also, of physical vapor deposition methods, it is desirable to coat by an arc ion plating method in which adhesion of the coating film is excellent. As a film type of the hard coating film, those of a nitride or carbonitride of a metal (including semimetal), which is a film type having excellent heat resistance and wear resistance, is desirable. Specifically, a hard coating film made of a nitride or carbonitride having a high Al content percentage and a total Al and Cr content percentage of 90 atomic % or more, which is a film type having excellent heat resistance and wear resistance, is preferably coated. Also, of hard coating films, a hard coating film having a finer coating film structure is preferably coated. Further, a hardness of this hard coating film is higher than that of the base material forming the end mill main body 1.

As the hard coating film, the hard coating film described in, for example, Japanese Patent No. 6410797 is preferably used. The hard coating film described in the above-described literature is made of nitride or carbonitride having an aluminum (Al) content percentage of 50 atomic % or more and 68 atomic % or less, a chromium (Cr) content percentage of 20 atomic % or more and 46 atomic % or less, and a silicon (Si) content percentage of 4 atomic % or more and 15 atomic % or less with respect to a total amount of metal (including semimetal) elements. Moreover, when a total amount of metal (including semimetal) elements, nitrogen, oxygen, and carbon is 100 atomic %, an atomic percentage (atomic %) A of metal (including semimetal) elements and an atomic percentage (atomic %) B of nitrogen satisfy a relationship of $1.03 \le B/A \le 1.07$. In an intensity profile obtained from an X-ray diffraction pattern or a selected area diffraction pattern of a transmission electron microscope, a peak intensity due to the (200) plane or the (111) plane of the face-centered cubic lattice structure shows a maximum intensity.

Further, a film thickness of the hard coating film is preferably 1.0 μm or more, and more preferably 2.0 μm or mom. Also, the film thickness of the hard coating film is preferably 3.0 μm or less. Further, as described in Japanese Patent No. 6410797, a protective film may be coated on the hard coating film. The protective film is a film made of nitride or carbonitride having a Ti content percentage of 50 atomic % or more and a Si content percentage of 1 atomic % or more and 30 atomic % or less with respect to a total amount of metal (including semimetal) elements. When a protective film is coated, wear resistance can be further improved even for a workpiece having a high hardness.

Also, the hard coating film can be coated on the surface of the end mill main body 1 by the coating method described in Japanese Patent No. 6410797. The coating method described in the above-described literature has the following steps. An alloy target having an aluminum (Al) content percentage of 55 atomic % or more and 70 atomic % or less, a chromium (Cr) content percentage of 20 atomic % or more and 35 atomic % or less, and a silicon (Si) content percentage of 7 atomic % or more and 20 atomic % or less with respect to a total amount of metal (including semimetal) elements is installed at a cathode. A hard coating film is formed on a surface of a base material by coating the surface of the base material with nitride or carbonitride by an arc ion plating method under the condition that a bias voltage applied to the base material is −220 V or higher and −60 V or lower and a cathode voltage is 22 V or higher and 27 V or lower, or a bias voltage applied to the base material is −120 V or higher and −60 V or lower and a cathode voltage is 28 V or higher and 32 V or lower.

In the ball end mill of the present embodiment, the gashes 8 of the chip discharge grooves 7 face each other on opposite sides with the axis O interposed therebetween without overlapping each other when viewed from the distal end side of the end mill main body 1 in the axis O direction. The ratio W/D of the width W (mm) of the chisel portion left between the facing chip discharge grooves to the diameter (diameter of the bottom blade 5a) D (mm) is within the range of 0.020 to 0.060. The ratio L/D of the facing length L (mm) of the gashes 8 of the chip discharge grooves 7 to the diameter D (mm) is within the range of 0.014 to 0.090. According to the ball end mill of the present embodiment, a sufficient size can be secured for the width W of the chisel portion 10 and the facing length L which is the length of the chisel portion 10 within a range that does not become larger than necessary.

Therefore, it is possible to suppress peeling of the hard coating film around the chisel portion 10 in which a cutting load increases because a diameter of the cutting blade 5 (bottom blade 5a) is as small as 2 mm or less and particularly a rotation speed is low. Therefore, occurrence of chipping, omissions, or the like can be prevented in the cutting blade 5 (bottom blade 5a) even for a workpiece with a high hardness, and thereby stable cutting work can be reliably performed over a long period of time.

When the ratio W/D of the width W (mm) of the chisel portion 10 to the diameter D (mm) is either too large or too small peeling of the hard coating film is likely to occur. Therefore, setting the ratio W/D within an appropriate range is important in increasing a service life of the tool. In the present embodiment, when the ratio W/D is increased to some extent to secure an appropriate extension distance (depth) of the hard coating film toward the rear of the chisel edge 10a in the end mill rotation direction T, adhesion of the hard coating film of the chisel portion 10 to the end mill main body 1 (base material) can be maintained. Thereby, early peeling off of the hard coating film from the base material can be curbed. Moreover, when the ratio W/D is reduced to a predetermined range and the extension distance (depth) of the hard coating film toward the rear of the chisel edge 10a in the end mill rotation direction T is reduced to an appropriate range, an increase in cutting load applied to the hard coating film of the chisel portion 10 is alleviated, and the hard coating film of the chisel portion 10 is made to sufficiently withstand peeling from the base material. As a result, chipping or omissions of the chisel portion 10 can be curbed.

When the ratio W/D of the width W (mm) of the chisel portion 10 to the diameter D (mm) is less than 0.020, a width of the chisel portion 10 becomes too small and the hard coating film cannot be coated with a sufficient thickness. The base material of the end mill main body 1 may be exposed at an early stage, and thereby there is a likelihood that chipping will occur due to a cutting load. On the other hand, when the ratio W/D exceeds 0.060, the hard coating film on the chisel portion 10 becomes too thick. The rotation trajectory around the axis O may protrude from the convex hemisphere having a center on the axis O, and this may cause deterioration in accuracy of the worked surface of the workpiece. Also, since a capacity of the chip discharge groove 7 is reduced, chip dischargeability is impaired and there is a likelihood that chip clogging will occur.

Further, when the ratio L/D of the facing length L (mm) of the gashes 8 to the diameter D (mm) also is either too large or too small, peeling of the hard coating film is likely to occur. Therefore, in addition to the above-described ratio W/D, setting the ratio L/D within an appropriate range is also important in increasing a service life of the tool. In the present embodiment, when the ratio L/D is reduced to a certain size, the chisel portion 10, which is left between the two chip discharge grooves 7 facing each other and made thin, does not become too long, and thereby the hard coating film being quickly peeled off from the base material is curbed. Moreover, when the ratio L/D is increased to some extent, satisfactory chip dischargeability in the vicinity of the chisel edge 10a can also be obtained, and peeling of the hard coating film due to accumulation of chips in the vicinity of the chisel portion 10 can also be curbed. As a result, chipping and omissions of the chisel portion 10 can be curbed.

Also when the ratio L/D of the facing length L (mm) of the gashes 8 of the chip discharge grooves 7, which is a length of the chisel portion 10, to the diameter D (mm) is less than 0.014, a capacity of the chip discharge groove is reduced, and thereby there is a likelihood of impairing the chip dischargeability. On the other hand, when the ratio L/D exceeds 0.090, the chisel portion 10 which is left between the gashes 8 of the two chip discharge grooves 7 facing each other and made thin becomes long. Even if the hard coating film has been coated, a strength of the base material portion of the end mill main body 1 is lowered, and a defect or the like is likely to occur.

In the present embodiment, when the rake angle of the bottom blade 5a in a range in which the chisel edge 10a is formed in the chisel portion 10 also is either too large or too small, peeling of the hard coating film is likely to occur. Therefore, in addition to the above-described ratio W/D and ratio L/D, setting the rake angle of the bottom blade 5a within an appropriate range is also important in increasing a service life of the tool. In the present embodiment, when the rake angle of the bottom blade 5a is increased in a negative direction, a lip angle is increased, a strength of the chisel portion, whose rotation speed is close to 0 and cutting resistance is large, is improved, and thereby peeling of the coating film can be curbed. Moreover, when the rake angle of the bottom blade is reduced to a certain size or less in the negative direction, cutting resistance can be inhibited from becoming excessive, and thereby peeling of the coating film can be curbed.

Also, in the ball end mill of the above-described configuration, the rake angle (true rake angle) of the bottom blade 5a in a range in which the chisel edge 10a is formed in the chisel portion 10 is set to be large within a range of −15° to −30° on a negative angle side. Therefore, a large lip angle of the bottom blade 5a in the chisel portion 10 can be secured. The chisel portion 10 is an intersecting ridge line portion between the wall surface 8a (rake face) of the gash 8 of the chip discharge groove 7 facing the end mill rotation direction and the distal end flank face 6. The hard coating film with a sufficient thickness can also be coated on the bottom blade 5a in a range in which the chisel edge 10a is formed in the chisel portion 10, and a strength of the bottom blade 5a itself can be improved. Occurrence of chipping, omission, or the like can be prevented in the bottom blade 5a.

Here, when the rake angle of the bottom blade 5a in a range in which the chisel edge 10a is formed in the chisel portion 10 is larger than −15° on a positive angle side, a sufficient lip angle of the bottom blade 5a cannot be secured. The wall surface 8a (rake face) is worn by cutting work over a short period of time, the rake angle becomes an extremely negative angle, and this causes an increase in cutting resistance and also increases a rotational drive force of the end mill main body 1. Also, when the rake angle of the bottom blade 5a in a range in which the chisel edge 10a is formed in the chisel portion 10 is larger than −30° on the negative angle side, cutting resistance from the beginning of the cutting work becomes too large. This results in an increase in rotational drive force of the end mill main body 1. Further, the rake angle of the bottom blade 5a may be gradually changed from the chisel portion 10 toward the outer circumferential blade 5b side. The rake angle of the bottom blade 5a on the outer circumferential blade 5b side may be either a negative angle or a positive angle.

Further, in the present embodiment, the distal end flank face 6 is formed by a plurality of (two) first and second flank face portions 6a and 6b in which a clearance angle increases from the bottom blade 5a toward a side opposite to the end mill rotation direction T. Therefore, the cutting resistance can be reliably reduced by the second flank face portion 6b having a large clearance angle while securing a larger lip angle of the bottom blade 5a by the first flank face portion 6 to further improve the strength. Further, since quality of roughness of the worked surface decreases when a clearance angle of the first flank face portion 6a is too small, the clearance angle of the first flank face portion 6a is preferably in a range of 5° to 10°. It is desirable that the clearance angle of the first flank face portion 6a be in a range of 7° to 10°. Further, it is desirable that a clearance angle of the second flank face portion 6b be in a range of 10° to 20°.

EXAMPLES

First Example

Examples 1 and 2

Next, examples of the present invention will be taken to demonstrate, particularly, effects of the ratio W/D of the width W (mm) of the chisel portion 10 to the diameter D (mm) and the ratio L/D of the facing length L (mm) of the chip discharge grooves 7 (the gashes 8) to the diameter D (mm) in the present invention. In the present examples, in a ball end mill in which the diameter D (mm) of the bottom blade 5a was 0.6 mm and the rake angle of the bottom blade 5a in a range in which the chisel edge 10a was formed in the chisel portion 10 was −20° on the basis of the above-described embodiment, a ball end mill having the ratio W/D of 0.023 and the ratio L/D of 0.075, and a ball end mill having the ratio W/D of 0.045 and the ratio L/D of 0.077 were manufactured. These are referred to as examples 1 and 2 in that order.

Examples 3 and 4

Also, in a ball end mill in which the diameter D (mm) of the bottom blade 5a was 0.6 mm on the basis of the above-described embodiment, a ball end mill in which the rake angle of the bottom blade 5a in a range in which the chisel edge 10a was formed in the chisel portion 10 was −25°, the ratio W/D was 0.040, and the ratio L/D was 0.052, and a ball end mill in which the rake angle of the bottom blade 5a in a range in which the chisel edge 10a was formed in the chisel portion 10 was −15°, the ratio W/D was 0.040, and the ratio L/D was 0.052 were manufactured. These are referred to as examples 3 and 4 in that order. Further, in ball end mills of examples 1 to 4, a clearance angle of the first flank face portion 6a was 6°, and a clearance angle of the second flank face portion 6b was 14°.

Comparative Examples 1 to 6

On the other hand, as comparative examples with respect to examples 1 to 4, six ball end mills in which the diameter D (mm) of the bottom blade was 0.6 mm as in examples 1 and 2, and a rake angle of the bottom blade in a range in which the chisel edge was formed in the chisel portion was −20° were manufactured. The ball end mills of comparative examples include a ball end mill having the ratio W/D of 0.007, which was smaller than 0.020, and the ratio L/D of 0.067, a ball end mill having the ratio W/D of 0.070, which was larger than 0.060, and the ratio L/D of 0.052, a ball end mill having the ratio W/D of 0.040 and the ratio L/D of 0.010 which was smaller than 0.014, a ball end mill having the ratio W/D of 0.040 and the ratio L/D of 0.100 which was larger than 0.090, a ball end mill having the ratio W/D of 0.012, which was smaller than 0.020, and the ratio L/D of 0.048, and a ball end mill having the ratio W/D of 0.008, which was smaller than 0.020, and the ratio L/D of 0.022. These are referred to as comparative examples 1 to 6 in that order.

Comparative Example 7

Further, as comparative examples with respect to examples 1 to 4, in a ball cod mill having the bottom blade diameter D (mm) of 0.6 mm as in examples 1 to 4 and comparative examples 1 to 6, a ball end mill in which a rake angle of the bottom blade in a range in which the chisel edge was formed in the chisel portion was −5°, the ratio W/D was 0.040, and the ratio L/D was 0.052 was also manufactured. This is referred to as comparative example 7. Further, in the ball end mills of comparative examples 1 to 7 also, a clearance angle of the first flank face portion 6a was 6°, and a clearance angle of the second flank face portion 6b was 14°.

(Cutting Test and Damage Observation)

Using the ball end mills of examples 1 to 4 and comparative examples 1 to 7, a cutting work of cutting a recessed part having a square bottom surface of 8 mm×8 mm on a workpiece made of ASP23 having a hardness of 64 HRC was performed for 30 minutes, and at that time, cutting conditions and damaged conditions of the ball end mill were observed. Cutting conditions were that a rotation number of the end mill main body 1 was 40,000 min$^{-1}$, a rotation speed was 75 m/min, a cutting speed was 800 mm/min, a feed rate per blade was 0.01 mm/t, an axial cutting depth was 0.005 mm, and a radial cutting depth was 0.01 mm, and cutting work was performed while blowing mist as a coolant.

In the ball end mills of examples 1 to 4 and comparative examples 1 to 7, hard coating films having the same composition were formed on surfaces of the end mill main bodies. As the hard coating film, one (AlCrSiN) described in Japanese Patent No. 6410797 described above was costed with an average film thickness of 2 μm, and a protective film (TiSiN) also described in Japanese Patent No. 6410797 was coated thereon with an average film thickness of 1 μm.

As a result of damage observation, in the ball end mill of comparative example 1 in which the ratio W/D was 0.007 which was smaller than 0.020, the ball end mill of comparative example 5 in which the ratio W/D was 0.012 which was smaller than 0.020, and the ball end mill of comparative example 6 in which the ratio W/D was 0.006 which was smaller than 0.020, chipping occurred especially in the chisel portion of the bottom blade. Also, in the bell end mill of comparative example 2 in which the ratio W/D was 0.070 which was larger than 0.060, a rotational drive force of the end mill main body increased due to a decrease in chip dischargeability, and an accuracy of the worked surface on the bottom surface of the recessed part formed in the workpiece was deteriorated.

Even in the ball end mill of comparative example 3 in which the ratio L/D was 0.010 which was smaller than 0.014, an increase in rotational drive force of the end mill main body due to a decrease in chip dischargeability was found. In the ball end mill of comparative example 4 in which the ratio L/D was 0.100 which was larger than 0.090, it was found that omissions were occurred in the end mill main body due to a decrease in strength of the bottom blade, especially around the chisel portion.

Also, in the ball end mill of comparative example 7 in which the rake angle of the bottom blade in a range in which the chisel edge was formed in the chisel portion was −5°, chipping occurred at an early stage due to a decrease in strength of the cutting edge. In contrast to the ball end mills of comparative examples 1 to 7, in the ball end mills of examples 1 to 4, no chipping or omissions in the cutting blade 5 including the bottom blade 5a was found, and wear was stable and normal.

Examples 5 and 6

Next, based on the ball end mill of example 1, a ball end mill in which a clearance angle of the first flank face portion 6a was 3°, and a ball end mill in which a clearance angle of the first flank face portion 6a was 9° were manufactured. These are referred to as examples 5 and 6 in that order. With the ball end mills of examples 5 and 6 and the ball end mill of example 1, as an evaluation of roughness of the worked surface in finishing work, cutting work was performed for 60 minutes under the same conditions as the above-described cutting conditions, and roughness of the worked surface on the bottom surface of the recessed part of the workpiece at that time was measured.

As a result, in any of the ball end mills of examples 1, 5, and 6, a worked surface roughness Rz (μm) of the workpiece after 60 minutes of the work was about 0.3 μm. In the ball end mill of example 5 in which the clearance angle of the first flank face portion 6a was 3°, it was found that there was a portion in which the first flank face portion 6a was rubbed for a long time and the worked surface was partially roughened at a portion in which the feed rate was low. On the other hand, in the ball end mill of example 6 in which the clearance angle of the first flank face portion 6a was 9°, it was found that a uniform worked surface was formed. Therefore, as described above, it is ascertained that the clearance angle of the first flank face portion 6a is preferably in a range of 5° to 10°. When the clearance angle of the first flank face portion 6a is in a range of 7° to 10°, a quality of the worked surface can be further improved.

Second Example (Comparison with Product Available on Market)

Further, assuming actual work of a mold, a cutting test and measurement of an amount of wear were performed using a CBN ball end mill available on the market in which the diameter D (mm) of a bottom blade was 0.6 mm, a rake angle of the bottom blade in a range in which the chisel edge was formed in the chisel portion was −18°, the ratio W/D was 0.035, and the ratio L/D was 0.070, and the ball end mill of example 1. In the cutting test, a cutting work was performed on a workpiece made of ASP23 having a hardness of 64 HRC to be cut with a length of 4 mm, a width of 73 mm, and a depth of 1.5 mm, and finished to have two pocket-shaped recessed parts having concave curved surfaces with a radius of 0.5 mm at corners of the bottom surface, and then a processing accuracy of the workpiece at that time was evaluated by comparing the first and second recessed parts. A wear amount was measured by measuring wear of the flank face of the ball end mill after the cutting work.

Further, cutting conditions were the same as the cutting conditions of the first example and that a rotation number of the end mill main body 1 was 40,000 min⁻1, a rotation speed was 75 m/min, a cutting speed was 800 mm/min, a feed rate per blade was 0.01 mm/t, an axial cutting depth was 0.005 mm, and a radial cutting depth was 0.01 mm, and cutting work was performed while blowing mist as a coolant.

As a result, in the ball end mill of example 1, an amount of scraping of a vertical wall portion of the recessed part was 0.012 mm in the first recessed part and 0.014 mm in the second recessed part. In contrast, in the CBN ball end mill, an amount of scraping of a vertical wall portion of the recessed part was 0.012 mm in the first recessed part and 0.016 mm in the second recessed part. Also, in the ball end mill of example 1, a difference in uncut amount in scraping the bottom surfaces of the first and second recessed parts was 0.001 mm in the linear portion and the corner portion. In contrast, in the CBN ball end mill, a difference in uncut amount in scraping the bottom surfaces of the first and second recessed parts was 0.002 mm in the linear portion and 0.003 mm to 0.005 mm in the corner portion.

Further, the worked surface roughness of the bottom surface in the ball end mill of example 1 was that the worked surface roughness Rz (μm) of the first recessed part was 0.5 μm, and the worked surface roughness Rz (μm) of the second recessed part was 0.69 μm. In contrast, the worked surface roughness of the bottom surface in the CBN ball end mill was that the worked surface roughness Rz of the first recessed part was 0.62 μm, and the worked surface roughness Rz of the second recessed part was 2.20 μm. Further, a wear width of the flank face was 0.017 mm in the ball end mill of example 1 and 0.029 mm in the CBN ball end mill. From these results, it is ascertained that the ball end mill of example 1 according to the present invention is comparable to the CBN ball end mills on the market or has an excellent processing accuracy and wear resistance.

TABLE 1

| | Tool diameter D (mm) | Rake angle (°) | W/D | L/D | Tool performance |
|---|---|---|---|---|---|
| Example 1 | 0.6 | −20 | 0.023 | 0.075 | Stable wear |
| Example 2 | 0.6 | −20 | 0.045 | 0.077 | Stable wear |
| Example 3 | 0.6 | −25 | 0.040 | 0.052 | Stable wear |
| Example 4 | 0.6 | −15 | 0.040 | 0.052 | Stable wear |
| Example 5 | 0.6 | −20 | 0.023 | 0.075 | Stable wear |
| Example 6 | 0.6 | −20 | 0.045 | 0.077 | Stable wear |
| Comparative example 1 | 0.6 | −20 | 0.007 | 0.067 | Chipping |
| Comparative example 2 | 0.6 | −20 | 0.070 | 0.052 | Increase in drive force, Deterioration in accuracy of worked surface |
| Comparative example 3 | 0.6 | −20 | 0.040 | 0.010 | Increase in drive force |
| Comparative example 4 | 0.6 | −20 | 0.040 | 0.100 | Decrease In strength |
| Comparative example 5 | 0.6 | −20 | 0.012 | 0.048 | Chipping |
| Comparative example 6 | 0.6 | −20 | 0.008 | 0.022 | Chipping |
| Comparative example 7 | 0.6 | −5 | 0.0040 | 0.052 | Chipping |

TABLE 2

| | Clearance angle of first flank face portion (°) | Tool performance |
|---|---|---|
| Example 1 | 6 | Worked surface Rz: about 0.3 μm. |
| Example 5 | 3 | Worked surface Rz: about 0.3 μm. There is partial roughness on worked surface. |
| Example 6 | 9 | Worked surface Rz: about 0.3 μm. Worked surface is uniform. |

TABLE 3

| | Tool diameter D (mm) | Rake angle (°) | W/D | L/D | Tool performance |
|---|---|---|---|---|---|
| Example 1 | 0.6 | −20 | 0.023 | 0.075 | Scraping amount of vertical wall: 0.012 mm, 0.014 mm Difference in uncut amount in scraping bottom surface: Linear portion: 0.001 mm Corner portion 0.001 mm Bottom surface Rz: 0.5 μm, 0.69 μm Wear width of flank face: 0.017 mm |
| CBN available on market | 0.6 | −18 | 0.035 | 0.070 | Scraping amount of vertical wall: 0.012 mm, 0.016 mm Difference in uncut amount in scraping bottom surface: Linear portion: 0.002 mm Corner portion 0.003 to 0.005 mm Bottom surface Rz: 0.62 μm, 2.20 μm Wear width of flank face: 0.029 mm |

REFERENCE SIGNS LIST

1 End mill main body
2 Shank part
3 Cutting blade part
4 Tapered neck part
5 Cutting blade
5a Bottom blade
5b Outer circumferential blade
6 Distal end flank face
6a First flank face portion
6b Second flank face portion
7 Chip discharge roove
8 Gash
8a Wall surface (rake face of bottom blade 5a) of chip discharge groove 7 (gash 8) facing end mill rotation direction T
9 Outer circumferential flank face
10 Chisel portion
10a Chisel edge
O Axis of end mill main body 1
T End mill rotation direction
D Diameter of convex hemisphere formed by bottom blade 5a in rotation trajectory around axis O
W Width of chisel portion 10
L Facing length of chip discharge grooves 7 (gashes 8)

The invention claimed is:

1. A ball end mill comprising:
   an end mill main body rotated around an axis in an end mill rotation direction; and
   a hard coating film coated on at least a surface of a distal end portion of the end mill main body, wherein
   two chip discharge grooves opening to distal end flank faces of the end mill main body and extending to a rear end side are formed on an outer circumference of the distal end portion of the end mill main body to be rotationally symmetrical with respect to the axis,
   a bottom blade having a convex hemispherical shape whose rotation trajectory around the axis has a center on the axis is formed on each of intersecting ridge line portions between wall surfaces of the two chip discharge grooves facing the end mill rotation direction and the distal end flank faces,
   a diameter D (mm) of a convex hemisphere formed by the bottom blade in the rotation trajectory around the axis is 2 mm or less,
   the chip discharge grooves face each other on opposite sides with the axis interposed therebetween without overlapping each other when viewed from a distal end side in the axial direction, a ratio W/D of a width W (mm) of a chisel portion left between the facing chip discharge grooves to the diameter D (mm) is within a range of 0.020 to 0.060, and a ratio L/D of a facing length L (mm) of the chip discharge grooves to the diameter D (mm) is within a range of 0.014 to 0.090, and
   a rake angle of the bottom blade in a range in which a chisel edge is formed in the chisel portion is within a range of −15° to −30°.

2. The ball end mill according to claim 1, wherein the distal end flank faces are each formed by a plurality of flank face portions in which a clearance angle increases from the bottom blade toward a side opposite to the end mill rotation direction.

3. The ball end mill according to claim 2, wherein
   the distal end flank face includes a first flank face portion and a second flank face portion aligned toward a side opposite to the end mill rotation direction from the bottom blade, and
   a clearance angle of the first flank face portion is 5° or more and 10° or less.

* * * * *